(12) United States Patent
Yang et al.

(10) Patent No.: US 11,561,837 B2
(45) Date of Patent: Jan. 24, 2023

(54) RESOURCE PROCESSING METHOD AND APPARATUS FOR MOBILE TERMINAL, COMPUTER DEVICE AND STORAGE MEDIUM

(71) Applicant: BEIJING XIAOMI MOBILE SOFTWARE CO., LTD., Beijing (CN)

(72) Inventors: Dongdong Yang, Beijing (CN); Qiwu Huang, Beijing (CN); Jun Tao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 255 days.

(21) Appl. No.: 16/914,670

(22) Filed: Jun. 29, 2020

(65) Prior Publication Data
US 2021/0248009 A1    Aug. 12, 2021

(30) Foreign Application Priority Data

Feb. 12, 2020    (CN) .......................... 202010088415.4

(51) Int. Cl.
*G06N 20/00*    (2019.01)
*G06F 9/50*    (2006.01)

(52) U.S. Cl.
CPC ........... *G06F 9/5027* (2013.01); *G06N 20/00* (2019.01)

(58) Field of Classification Search
CPC .............................. G06F 9/5027; G06N 20/00
See application file for complete search history.

(56) References Cited

U.S. PATENT DOCUMENTS

| | | | | |
|---|---|---|---|---|
| 10,657,461 B2 * | 5/2020 | McMahan | ............... | G06F 17/18 |
| 10,803,184 B2 * | 10/2020 | Zhou | ....................... | G06F 21/60 |
| 10,824,958 B2 * | 11/2020 | Ramage | .................. | H04L 67/01 |
| 11,017,322 B1 * | 5/2021 | Du | .......................... | H04L 67/10 |
| 11,227,187 B1 * | 1/2022 | Weinberger | .............. | G06N 3/04 |
| 2016/0063393 A1 * | 3/2016 | Ramage | .................. | H04L 67/01 |
| | | | | 706/12 |
| 2016/0078361 A1 * | 3/2016 | Brueckner | ............. | H04L 67/10 |
| | | | | 706/12 |
| 2016/0352900 A1 * | 12/2016 | Bell | ..................... | H04M 3/5175 |
| 2017/0318083 A1 * | 11/2017 | Ignatyev | ............. | H04L 43/0876 |
| 2019/0220320 A1 | 7/2019 | Zhou et al. | | |
| 2019/0340534 A1 * | 11/2019 | McMahan | ............... | G06F 17/16 |

(Continued)

FOREIGN PATENT DOCUMENTS

| | | | | |
|---|---|---|---|---|
| CN | 107995357 A | | 5/2018 | |
| CN | 108415770 A | * | 8/2018 | ............... G06F 9/50 |

(Continued)

OTHER PUBLICATIONS

European Search Report in the European application No. EP201879913, dated Jan. 18, 2021.

(Continued)

*Primary Examiner* — Hai V Nguyen
(74) *Attorney, Agent, or Firm* — Syncoda LLC; Feng Ma

(57) ABSTRACT

A resource processing method includes: determining a current application scenario and usage data of the mobile terminal; inputting the usage data into a machine learning algorithm model corresponding to the current application scenario to obtain predicted recommendation parameters; and configuring resources of the mobile terminal based on the recommendation parameters.

15 Claims, 14 Drawing Sheets

(56) References Cited

U.S. PATENT DOCUMENTS

| | | | |
|---|---|---|---|
| 2020/0159572 A1* | 5/2020 | Jagemar | G06F 9/5066 |
| 2021/0044535 A1* | 2/2021 | Ignatyev | H04L 47/70 |
| 2021/0056458 A1* | 2/2021 | Savova | G06N 20/00 |
| 2021/0073290 A1* | 3/2021 | Hunter | G06F 8/65 |

FOREIGN PATENT DOCUMENTS

| | | | | |
|---|---|---|---|---|
| CN | 110188472 A | | 8/2019 | |
| CN | 110339567 A | * | 10/2019 | ............. A63F 13/52 |
| WO | 2017206854 A1 | | 12/2017 | |

OTHER PUBLICATIONS

Steffen Rendle, Department of Reasoning for Intelligence, The Institute of Scientific and Industrial Research, Osaka University, Japan, "Factorization Machines".

Huifeng Guo et al., Shenzhen Graduate School, Harbin Institute of Technology, China; Noah's Ark Research Lab, Huawei, China, "DeepFM: A Factorization-Machine based Neural Network for CTR Prediction", Mar. 13, 2017.

\* cited by examiner

RESOURCE PROCESSING METHOD AND APPARATUS FOR MOBILE TERMINAL, COMPUTER DEVICE AND STORAGE MEDIUM

CROSS-REFERENCE TO RELATED APPLICATION

This application claims priority to Chinese patent application No. 202010088415.4 filed on Feb. 12, 2020, the disclosure of which is hereby incorporated by reference in its entirety.

BACKGROUND

A variety of applications can run in a mobile terminal, and various resources need to be configured for implementing functions of different applications. Taking an inner core management function of a mobile terminal as an example, various resources are generally allocated through configuration parameters when a bottom-layer inner core of a smart mobile terminal system makes power management, file system input/output management, scheduling management, memory management, device management, etc. The configuration values of the parameter are usually initialized at startup. Herein, many of the various configuration parameters provided by the inner core are using empirical values, and various resources cannot be allocated according to the respective usage habits and scenarios of different users. In this way, when performing resource allocation, there may be insufficient resource allocation or excessive resource allocation.

SUMMARY

The disclosure relates to the technical field of mobile terminals, in particular to a resource processing method, apparatus, a computer device, and a storage medium.

According to a first aspect of embodiments of the disclosure, there is provided a resource processing method for a mobile terminal, including:

determining the current application scenario and usage data of the mobile terminal;

inputting the usage data into a machine learning algorithm model corresponding to the current application scenario to obtain predicted recommendation parameters; and configuring resources of the mobile terminal based on the recommendation parameters.

According to a second aspect of the embodiments of the disclosure, there is further provided a resource processing apparatus for a mobile terminal, including a processor and a memory connected with the processor and configured to store instructions executable by the processor.

The processor may be configured to:

determine a current application scenario and usage data of the mobile terminal;

input the usage data into a machine learning algorithm model corresponding to the current application scenario to obtain predicted recommendation parameters; and configure resources of the mobile terminal based on the recommendation parameters.

According to a third aspect of the embodiments of the disclosure, there is further provided a computer device, including a memory and a processor.

The processor may be connected with the memory and configured to implement the method provided by any embodiment of the disclosure by executing computer-executable instructions stored on the memory.

According to a fourth aspect of the disclosure, there is further provided a computer storage medium, having stored computer-executable instructions, wherein the computer-executable instructions can implement the method provided by any embodiment of the disclosure when being executed by a processor.

It should be understood that the above general descriptions and later detailed descriptions are merely exemplary and illustrative, and cannot limit the disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1A:
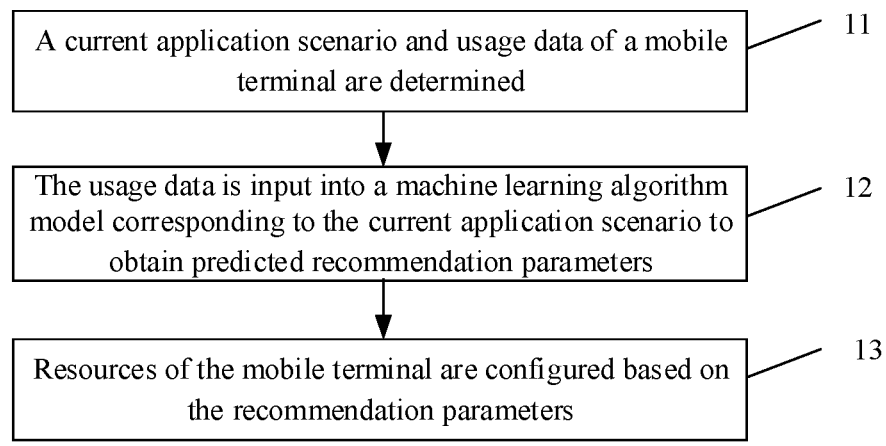
FIG. 1A is a flowchart showing a resource processing method for a mobile terminal according to some embodiments of the disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the device and method in accordance with certain aspects of the subject disclosure as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Terms used in the present disclosure are only adopted for the purpose of describing specific embodiments but not intended to limit the present disclosure. "A/an" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that "first", "second" and similar terms used in the specification and claims of the present application are not to represent any sequence, number or importance but only to distinguish different parts. Likewise, similar terms such as "one" or "a/an" also do not represent a number limit but represent "at least one". Unless otherwise pointed out, terms like "front", "rear", "lower" and/or "upper" are only for convenient description but not limited to a position or a spatial orientation. Terms like "include" or "contain" refer to that an element or object appearing before "include" or "contain" covers an element or object and equivalent thereof listed after "include" or "contain" and does not exclude another element or object. Similar terms such as "connect" or "interconnect" are not limited to physical or mechanical connection, and may include electrical connection, either direct or indirect.

FIG. 1A is a flowchart showing a resource processing method for a mobile terminal according to some embodiments of the disclosure. As shown in FIG. 1A, the method is applied to the mobile terminal, and includes the following steps.

Step 11 is that a current application scenario and usage data of the mobile terminal are determined.

Herein, the mobile terminal may be a mobile phone, a tablet computer, a smart bracelet, a smart watch, a vehicle terminal, etc.

Herein, the application scenario may be an application situation when a user uses a certain function or multiple functions of the mobile terminal at a time point or within a time period. Herein, the functions of the mobile terminal may be music playing, traffic navigation, social chatting, voice communication, photographing, game playing, etc. In some embodiments, for the music playing function, an application situation, under which a user is playing music at a current time point and a screen of a mobile terminal is in an off state when the music is played, may be an application scenario of the mobile terminal. Herein, the application scenario may include listening to music with the screen of the mobile terminal being off, traffic navigation, social chatting, voice communication, photographing, game playing, etc. Herein, different application programs may run in the mobile terminal under different application scenarios.

In some embodiments, when music is played with the screen being off, a screen management application program and a music player application program may run in the mobile terminal.

Herein, the usage data may be the feature data when an application program runs under the current application scenario. The feature data may indicate running features of the terminal under the current application scenario. For example, the running features may include: a screen resolution of the screen of the mobile terminal, a frequency of instruction execution, a networking state, memory usage, power consumption, etc. Herein, the application scenario and the usage data can truly reflect the habit of the user using the mobile terminal. In some embodiments, the usage data of the user under the scenario of listening to music with the screen of the mobile terminal being off may be: the screen-off time is 1:00 to 2:00 at noon and a player is in a networking state. Therefore, it can reflect that the user generally listens to music with the screen of the mobile terminal being off from 1:00 to 2:00 at noon and generally in the networking state.

Step 12 is that the usage data are input into a machine learning algorithm model corresponding to the current application scenario to obtain predicted recommendation parameters.

Herein, the machine learning algorithm model may be a Factorization Machine (FM) model, a Deep Neural Networks (DNN) model, a Deep Factorization Machine (DeepFM) model, etc. The DeepFM model may be composed of the FM model and the DNN model.

Figure 1B:
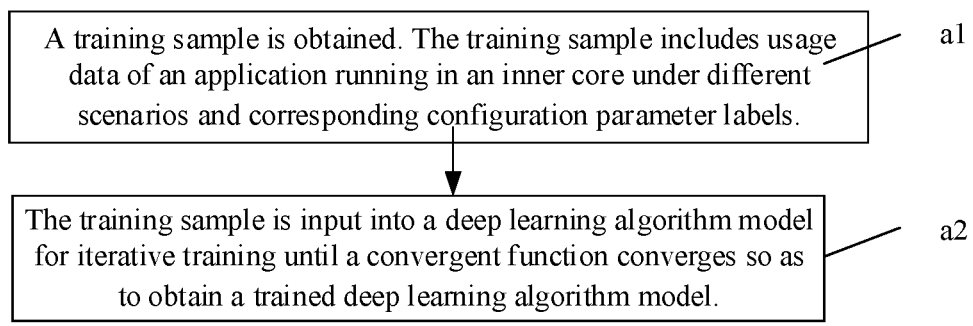
FIG. 1B is a flowchart showing a resource processing method for a mobile terminal according to some embodiments of the disclosure.

In some embodiments, the machine learning algorithm model may be the DNN model. Before inputting the usage data into the machine learning algorithm model corresponding to the current application scenario, the DNN model may be trained in advance. In some embodiments, referring to FIG. 1B, with running an application program in an inner core under scenario A as an example, the steps of training the DNN model may include:

step a1: a training sample is obtained; the training sample may include both usage data of an application running in the inner core under different scenarios and the corresponding configuration parameter labels. The configuration parameter labels may be configuration parameters corresponding to the usage data; and step a2: the training sample is input into a deep learning algorithm model for iterative training until a convergent function converges so as to obtain a trained deep learning algorithm model.

Figure 1C:
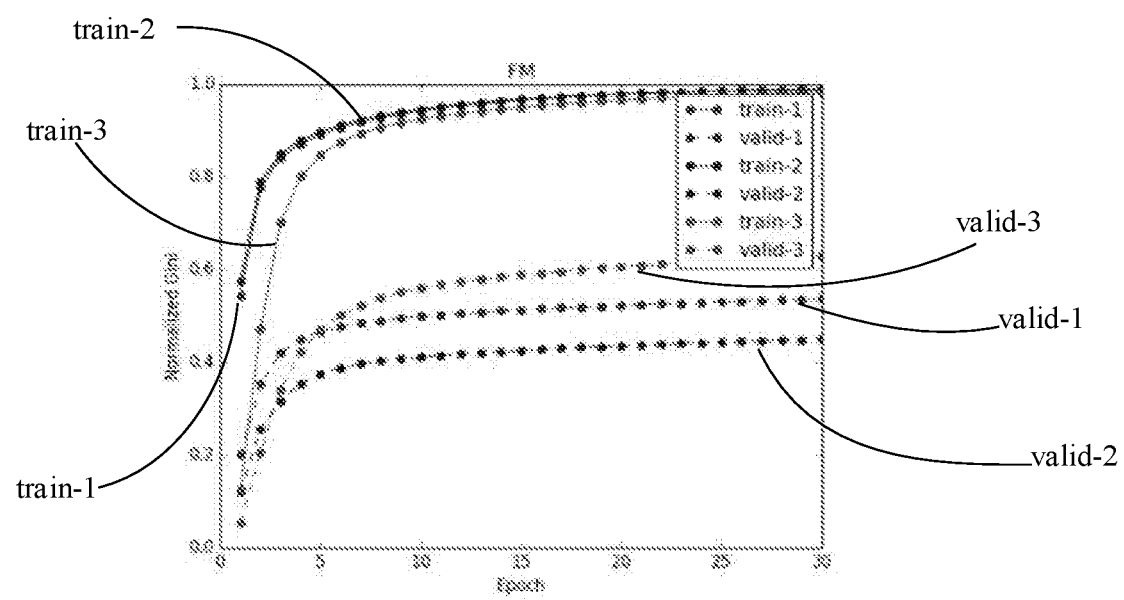
FIG. 1C is a schematic diagram showing test data according to some embodiments of the disclosure.
Figure 1D:
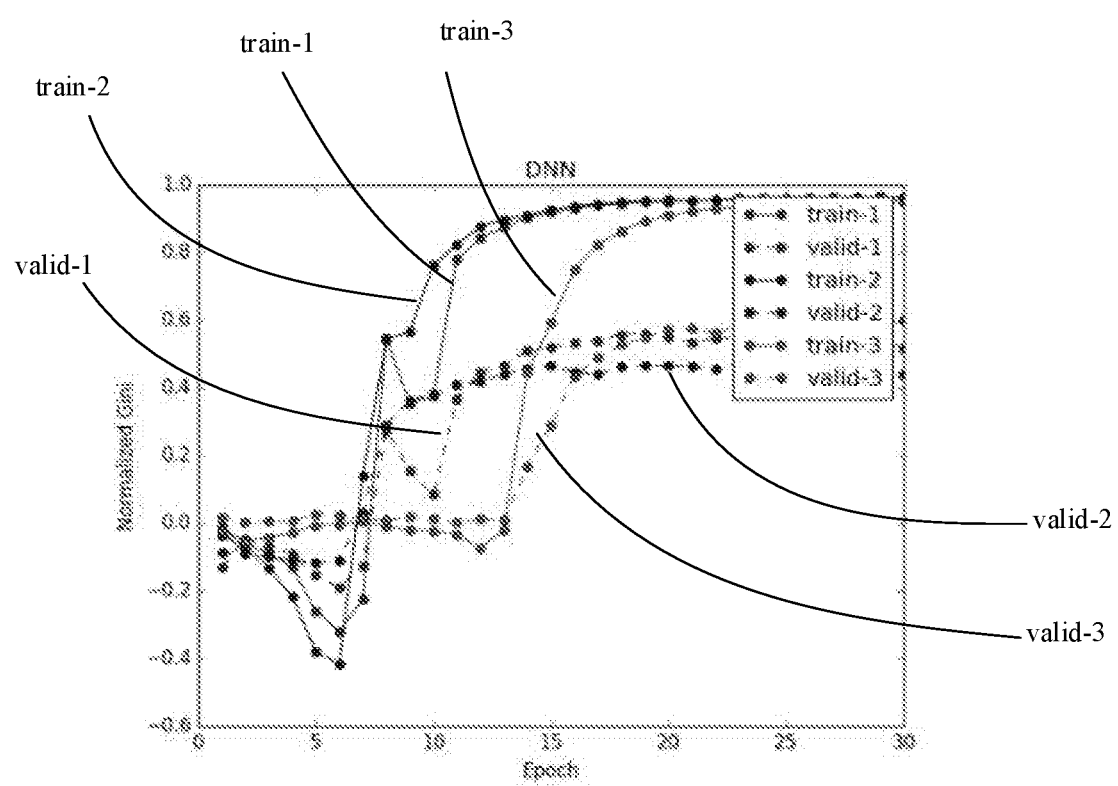
FIG. 1D is a schematic diagram showing test data according to some embodiments of the disclosure.
Figure 1E:
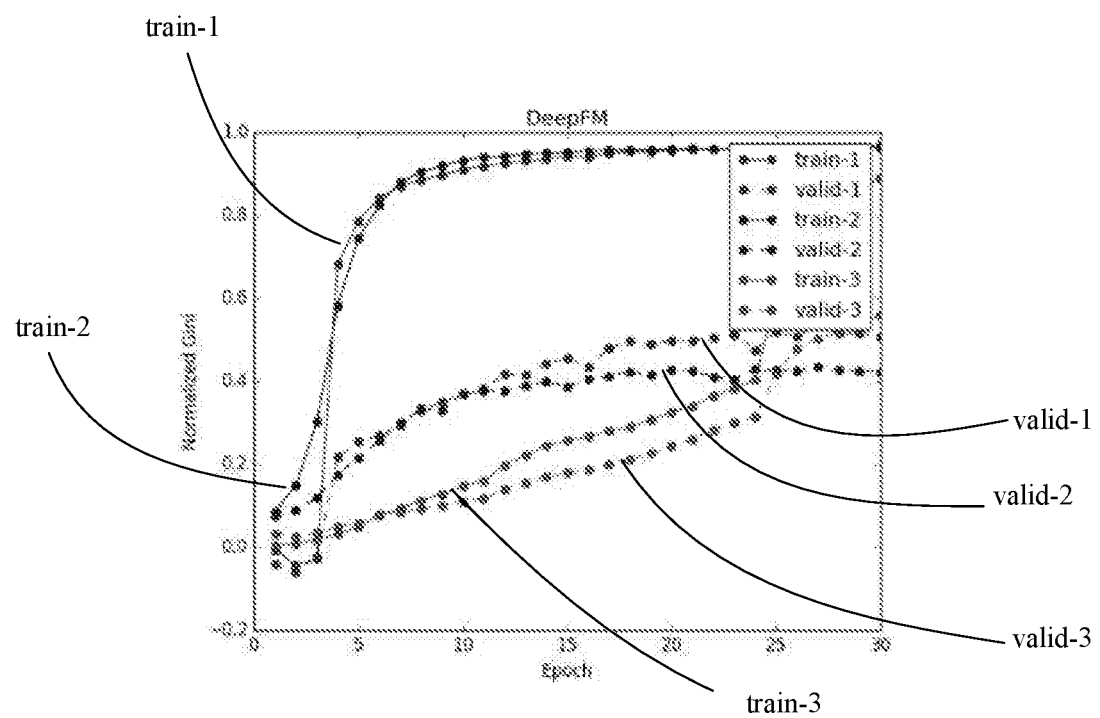
FIG. 1E is a schematic diagram showing test data according to some embodiments of the disclosure.

In some embodiments according to the method implementing the embodiment of the disclosure, under the scenario of listening to music with a screen of a mobile terminal being off, the recommendation parameters may be predicted based on the FM model, the DNN model and the DeepFM model, and resources of the mobile terminal may be configured based on the recommendation parameters. Referring to FIG. 1C, FIG. 1D, and FIG. 1E respectively, abscissa axis coordinates (epoch) represent time, and ordinate axis coordinates (normalized Gini) represent a Gini coefficient. FIG. 1C, FIG. 1D and FIG. 1E respectively correspond to situations where the FM model, the DNN model, and the DeepFM model are applied, and illustrate predicted values (train) of power consumption required by a user and power consumption values (valid) of real consumption. Identifiers train-1 and valid-1 represent first iteration, identifiers train-2 and valid-2 represent second iteration, and identifiers train-3 and valid-3 represent third iteration. Herein, the accuracy can reach 97% based on the DeepFM model.

Herein, the recommendation parameters may include allocation parameters of hardware resources or software resources. The hardware resources may be input/output interface resources, memory resources, etc. The software resources may be resources for scheduling management programs, frequency resources for executing program instructions, etc.

Step 13: resources of the mobile terminal are configured based on the recommendation parameters.

Herein, configuring the resources of the mobile terminal may be allocating resources to a system program or application program running in the mobile terminal. In some embodiments, the resources of the mobile terminal may be configured via configuration files. The configuration files may include the recommendation parameters.

In the embodiments of the disclosure, the current application scenario and the usage data of the mobile terminal may be determined; the usage data may be input into the machine learning algorithm model corresponding to the current application scenario to obtain the predicted recommendation parameters; and the resources of the mobile terminal may be configured based on the recommendation parameters. Herein, the recommendation parameters may be obtained based on the current application scenario and the usage data of the mobile terminal, the application scenario and the usage data can both truly reflect resource configuration requirements of a user, and more accurate predicted recommendation parameters meeting individualized user requirements can be obtained by inputting the usage data into the machine learning algorithm model corresponding to the current application scenario. The resources of the mobile terminal may be configured based on the recommendation parameters, so that individualization of resource configuration in the terminal is realized, and individualized experience of the user and the resource utilization can be improved. Various problems caused by configuration using empirical parameters can be solved, for example, a problem that a system response is slow and user experience is affected due to a fact that memory allocated to a user under a game scenario is insufficient by memory management. Resource waste caused by over-allocation of memory can also be reduced.

Figure 2:
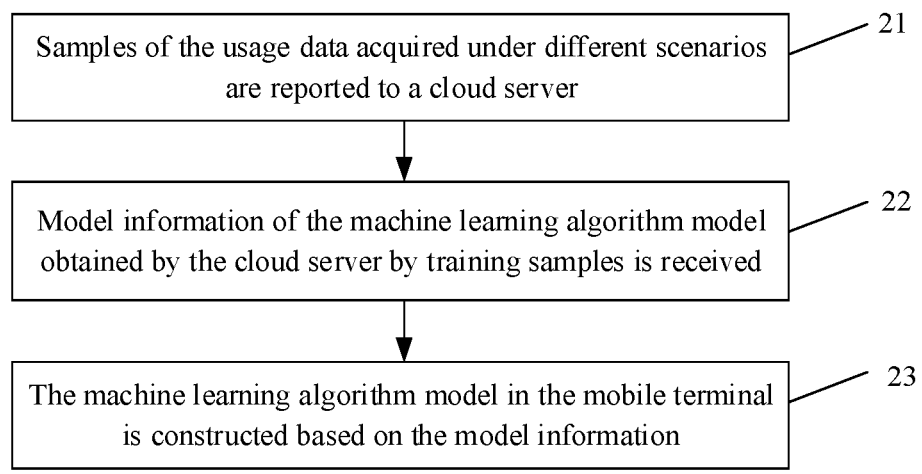
FIG. 2 is a flowchart showing a resource processing method for a mobile terminal according to some embodiments of the disclosure.

FIG. 2 is a flowchart showing a resource processing method for a mobile terminal according to some embodiments of the disclosure. As shown in FIG. 2, the method is applied to the mobile terminal. In step 12, before inputting the usage data into the machine learning algorithm model corresponding to the current application scenario, the method may further include the following steps.

Step 21 includes that samples of the usage data acquired under different scenarios are reported to a cloud server.

Herein, the different scenarios may include an application scenario of listening to music with a screen of the mobile terminal being off, an application scenario of traffic navigation, an application scenario of social chatting, an application scenario of voice communication, an application scenario of photographing, an application scenario of game playing, etc. The different scenarios may also be application scenarios where applications run in different modes, such as a daytime navigation scenario or a night navigation scenario of a traffic navigation application, and an automatic reply scenario or an artificial reply scenario of a social chatting application.

In some embodiments, the samples of the usage data may be acquired periodically under a certain scenario and reported to the cloud server.

Herein, the cloud server may be a server or a server group with a strong computation capacity remotely deployed for a large number of mobile terminals. The cloud server is configured to share a computation task of the mobile terminal.

Step 22, model information of the machine learning algorithm model obtained by the cloud server by training the samples is received.

In some embodiments, the model information of the machine learning algorithm model obtained by the cloud server by training the samples may be received when software of the mobile terminal is upgraded at the cloud server.

In some embodiments, the model information of the machine learning algorithm model obtained by training the samples may be sent to the mobile terminal by the cloud server in real time. In some embodiments, after training, the model information of the machine learning algorithm model obtained by training the samples may be sent to the mobile terminal when the accuracy of the predicted recommendation parameters of the machine learning algorithm model is greater than a preset threshold. For example, the model information of the machine learning algorithm model obtained by training the samples may be sent to the mobile terminal respectively when the accuracy of the predicted recommendation parameters of the machine learning algorithm model is greater than 90%, 95%, and 98%.

Herein, the model information may be information for constructing and running the machine learning algorithm model. In some embodiments, the model information may include program data.

Step 23 includes that the machine learning algorithm model is constructed in the mobile terminal based on the model information.

In some embodiments, constructing the machine learning algorithm model in the mobile terminal may include storing the model information and running the program data included in the model information.

Figure 3:
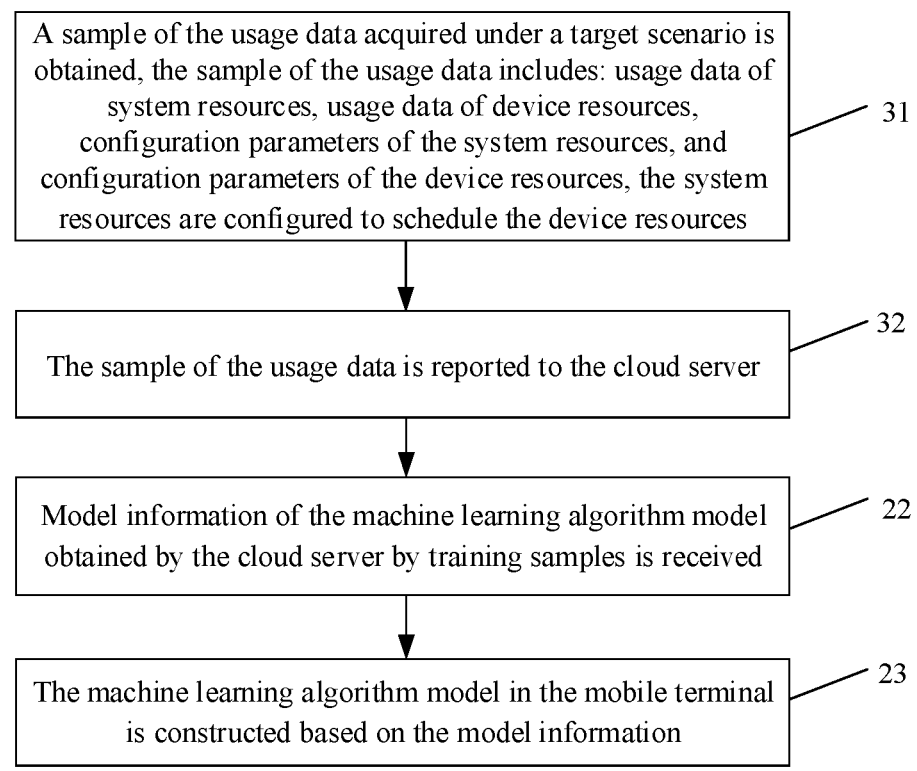
FIG. 3 is a flowchart showing a resource processing method for a mobile terminal according to some embodiments of the disclosure.

FIG. 3 is a flowchart showing a resource processing method for a mobile terminal according to some embodiments of the disclosure. As shown in FIG. 3, in step 21, reporting the samples of the usage data acquired under different scenarios to the cloud server may include the following steps.

Step 31 includes: a sample of the usage data acquired under a target scenario is obtained; the sample of the usage data includes: usage data of system resources, usage data of device resources, configuration parameters of the system resources, and configuration parameters of the device resources; the system resources are configured to schedule the device resources.

Herein, the system resources may be program scheduling resources for realizing a certain function, frequency resources for executing instructions and the like when an operating system of the mobile terminal runs. Herein, the device resources may be input/output interface resources, bus resources, memory resources, etc.

Herein, the configuration parameters of the system resources may be configuration parameters for allocating the system resources to a target application, and the configuration parameters of the device resources may be configuration parameters for configuring the device resources to the target application.

Step 32: the sample of the usage data is reported to the cloud server.

Figure 4:
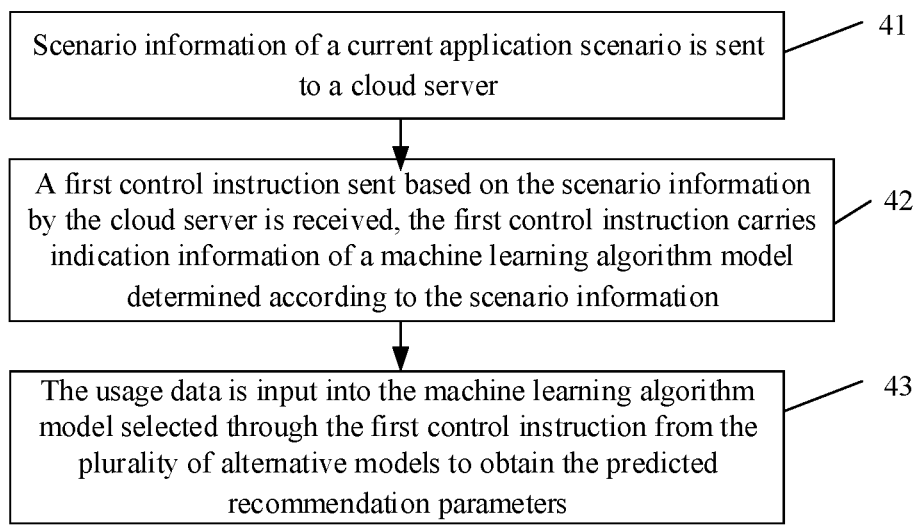
FIG. 4 is a flowchart showing a resource processing method for a mobile terminal according to some embodiments of the disclosure.

FIG. 4 is a flowchart showing a resource processing method for a mobile terminal according to some embodiments of the disclosure. As shown in FIG. 4, the method further includes the following steps.

Step 41 includes that scenario information of a current application scenario is sent to a cloud server.

Step 42 includes that, a first control instruction sent based on the scenario information by the cloud server is received, and the first control instruction carries indication information of a machine learning algorithm model determined according to the scenario information.

Herein, the scenario information may be a set of multiple feature parameters. In an example, for a traffic navigation application, first feature parameters may be parameters representing daytime navigation or dusk navigation, and second feature parameters may be parameters representing near-distance navigation or far-distance navigation. An application scenario of the traffic navigation application may be determined based on the feature parameters.

In some embodiments, a scenario may correspond to a plurality of machine learning algorithm models, and the cloud server may quickly select one machine learning algorithm model with the best prediction result from the plurality of machine learning algorithm models based on the strong computation capacity thereof for the mobile terminal. In some embodiments, the first control instruction may carry an identifier of the selected algorithm model. For example, an identifier of a first machine learning algorithm model is "001", so "001" is carried in the first control instruction.

In step 12, inputting the usage data into the machine learning algorithm model corresponding to the current application scenario to obtain the predicted recommendation parameters may include:

Step 43: the usage data are input into the machine learning algorithm model selected through the first control instruction from the plurality of alternative models to obtain the predicted recommendation parameters.

In some embodiments, model information of the plurality of alternative machine learning algorithm models may be stored in the mobile terminal in advance. In some embodiments, when the machine learning algorithm model is selected, the model information of the machine learning algorithm model can be obtained from a storage region, and programs included in the model information can be run.

Figure 5:
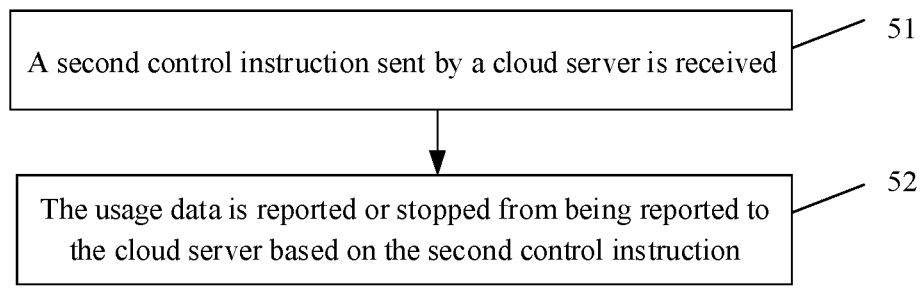
FIG. 5 is a flowchart showing a resource processing method for a mobile terminal according to some embodiments of the disclosure.

FIG. 5 is a flowchart showing a resource processing method for a mobile terminal according to some embodiments of the disclosure. As shown in FIG. 5, the method may further include the following steps.

Step 51 may include that, a second control instruction sent by a cloud server is received.

The second control instruction may carry at least one piece of following information: type indication information controlling the mobile terminal to acquire usage data, and indication information controlling the mobile terminal to report or stop reporting the usage data to the cloud server.

In some embodiments, under the scenario of listening to music with a screen of the mobile terminal being off, the indication information may include: indication information for acquiring the usage data when the screen-off time is 1:00 to 2:00 at noon, and indication information for acquiring a networking state of a player.

In some embodiments, the second control instruction may carry indication information for controlling the mobile terminal to stop reporting the usage data to the cloud server when the reporting quantity of the usage data is greater than a preset threshold.

In some embodiments, the second control instruction may carry indication information for controlling the mobile terminal to stop reporting the usage data to the cloud server when the accuracy of predicted recommendation parameters of a machine learning algorithm model is greater than a preset threshold.

Step 52 includes that, based on the second control instruction, the usage data are reported to or stopped from being reported to the cloud server.

In some embodiments, the mobile terminal may be controlled to stop reporting the usage data to the cloud server when the reporting quantity of the usage data is greater than a preset threshold.

In some embodiments, the mobile terminal may be controlled to stop reporting the usage data to the cloud server when the accuracy of the predicted recommendation parameters of the machine learning algorithm model is greater than a preset threshold.

Figure 6:
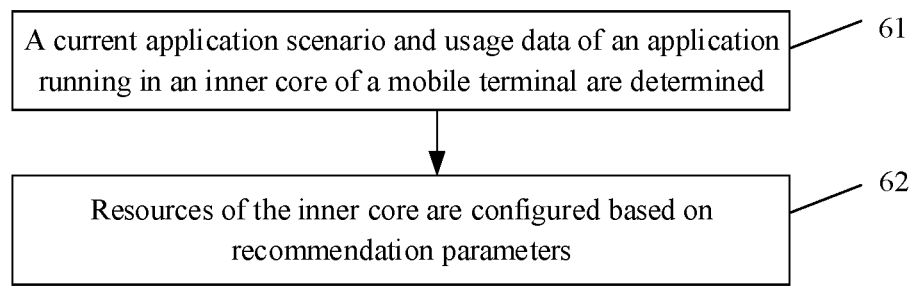
FIG. 6 is a flowchart showing a resource processing method for a mobile terminal according to some embodiments of the disclosure.

FIG. 6 is a flowchart showing a resource processing method for a mobile terminal according to some embodiments of the disclosure.

As shown in FIG. 6, in step 11, determining the current application scenario and the usage data of the mobile terminal may include step 61 which includes that a current application scenario and usage data of an application running in an inner core of the mobile terminal are determined.

In some embodiments, a plurality of applications may run in the inner core. An application scenario may be that a plurality of applications run. The usage data may include usage data of a plurality of applications.

In step 13, configuring the resources of the mobile terminal based on the recommendation parameters may include:

Step 62: resources of the inner core are configured based on the recommendation parameters.

Herein, the resources of the inner core may include hardware resources and software resources managed by the inner core. Herein, the hardware resources may be input/output interface resources, memory resources, etc. The software resources may be resources for scheduling management programs, frequency resources for executing program instructions, etc.

Figure 7:
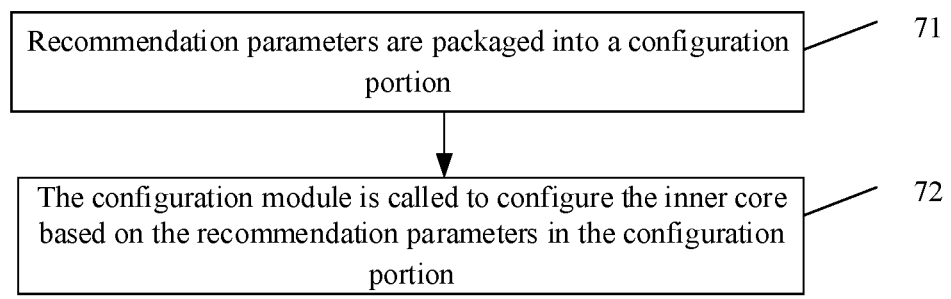
FIG. 7 is a flowchart showing a resource processing method for a mobile terminal according to some embodiments of the disclosure.

FIG. 7 is a flowchart showing a resource processing method for a mobile terminal according to some embodiments of the disclosure. As shown in FIG. 7, the method may further include:

step 71: recommendation parameters are packaged into a configuration portion.

Herein, the recommendation parameters may be packaged into the configuration portion to facilitate being called during configuration. In some embodiments, each application scenario may correspond to a configuration portion, and therefore, when same application scenarios appear, the configuration portions may be directly called and the efficiency is improved.

In step 13, configuring the resources of the inner core based on the recommendation parameters may include:

step 72: the configuration portion is called to configure the inner core based on the recommendation parameters in the configuration portion.

Herein, the configuration portion may correspond to a configuration file. Configuring the inner core based on the recommendation parameters in the configuration portion may be configuring the inner core based on recommendation parameters in the configuration file.

Figure 8:
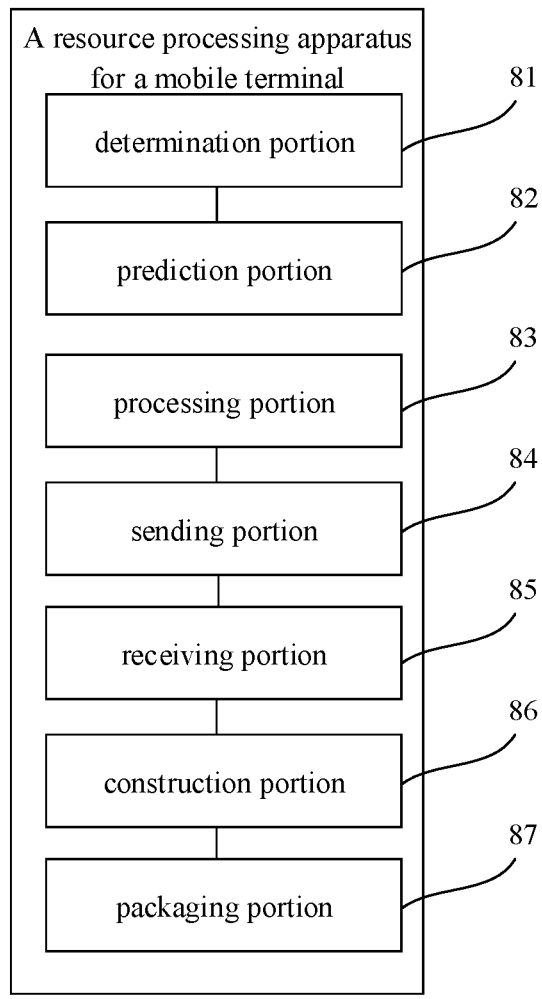
FIG. 8 is a block diagram illustrating a resource processing apparatus for a mobile terminal according to some embodiments of the disclosure.

FIG. 8 is a block diagram illustrating a resource processing apparatus for a mobile terminal according to some embodiments of the disclosure. Referring to FIG. 8, the resource processing apparatus includes a determination portion 81, a prediction portion 82, and a processing portion 83.

The determination portion 81 is configured to determine a current application scenario and usage data of the mobile terminal.

The prediction portion 82 is configured to input the usage data into a machine learning algorithm model corresponding to the current application scenario to obtain predicted recommendation parameters.

The processing portion 83 is configured to configure resources of the mobile terminal based on the recommendation parameters.

In some embodiments, the resource processing apparatus may further include a sending portion 84, a receiving portion 85, and a construction portion 86.

The sending portion 84 is configured to report samples of the usage data acquired under different scenarios to a cloud server.

The receiving portion 85 is configured to receive model information of the machine learning algorithm model obtained by the cloud server by training samples.

The construction portion 86 is configured to construct the machine learning algorithm model in the mobile terminal based on the model information.

In some embodiments, the sending portion 84 is further configured to obtain a sample of the usage data acquired under a target scenario. The sample of the usage data may include: usage data of system resources, usage data of device resources, configuration parameters of the system resources, and configuration parameters of the device resources. The system resources are configured to schedule the device resources. The sending portion 84 is further configured to report the sample of the usage data to the cloud server.

In some embodiments, the sending portion 84 is further configured to send scenario information of the current application scenario to the cloud server. The receiving portion 85 is further configured to receive a first control instruction sent based on the scenario information by the cloud server. The first control instruction may carry indication information of the machine learning algorithm model determined according to the scenario information. The processing portion 86 is further configured to input the usage data into the machine learning algorithm model selected through the first control instruction from a plurality of alternative models to obtain the predicted recommendation parameters.

In some embodiments, the receiving portion 85 is further configured to receive a second control instruction from the cloud server.

The second control instruction may carry at least one piece of following information: type indication information controlling the mobile terminal to acquire usage data, and indication information controlling the mobile terminal to report or stop reporting the usage data to the cloud server.

The processing portion 86 is further configured to report or stop reporting the usage data to the cloud server based on the second control instruction.

In some embodiments, the determination portion 81 is further configured to determine a current application scenario and usage data of an application running in an inner core of the mobile terminal.

The processing portion 83 is further configured to configure resources of the inner core based on the recommendation parameters.

In some embodiments, the resource processing apparatus may further include a packaging portion 87. The packaging portion is configured to package the recommendation parameters into a configuration portion. The processing portion 83 is further configured to call the configuration portion to configure the inner core based on the recommendation parameters in the configuration portion.

The embodiments of the disclosure further provide a computer device including a memory and a processor.

The processor may be connected with the memory and configured to implement the method provided by any embodiment of the disclosure by executing computer-executable instructions stored on the memory.

The memory may include storage media of various types. The storage media may be non-transitory computer storage media, and can continue to memorize information stored thereon after a communication device is powered down.

The processor may be connected with the memory via a bus and the like, and configured to read executable programs stored on the memory, such as at least one of the method of any embodiment of the disclosure.

The embodiments of the disclosure further provide a computer storage medium which has stored computer-executable instructions. The computer-executable instructions can implement the method provided by any embodiment of the disclosure when being executed by the processor.

With respect to the resource processing apparatus in the above embodiments, the specific manners for performing operations for each portion therein have been described in detail in the embodiments regarding the method, which will not be elaborated herein.

Figure 9:
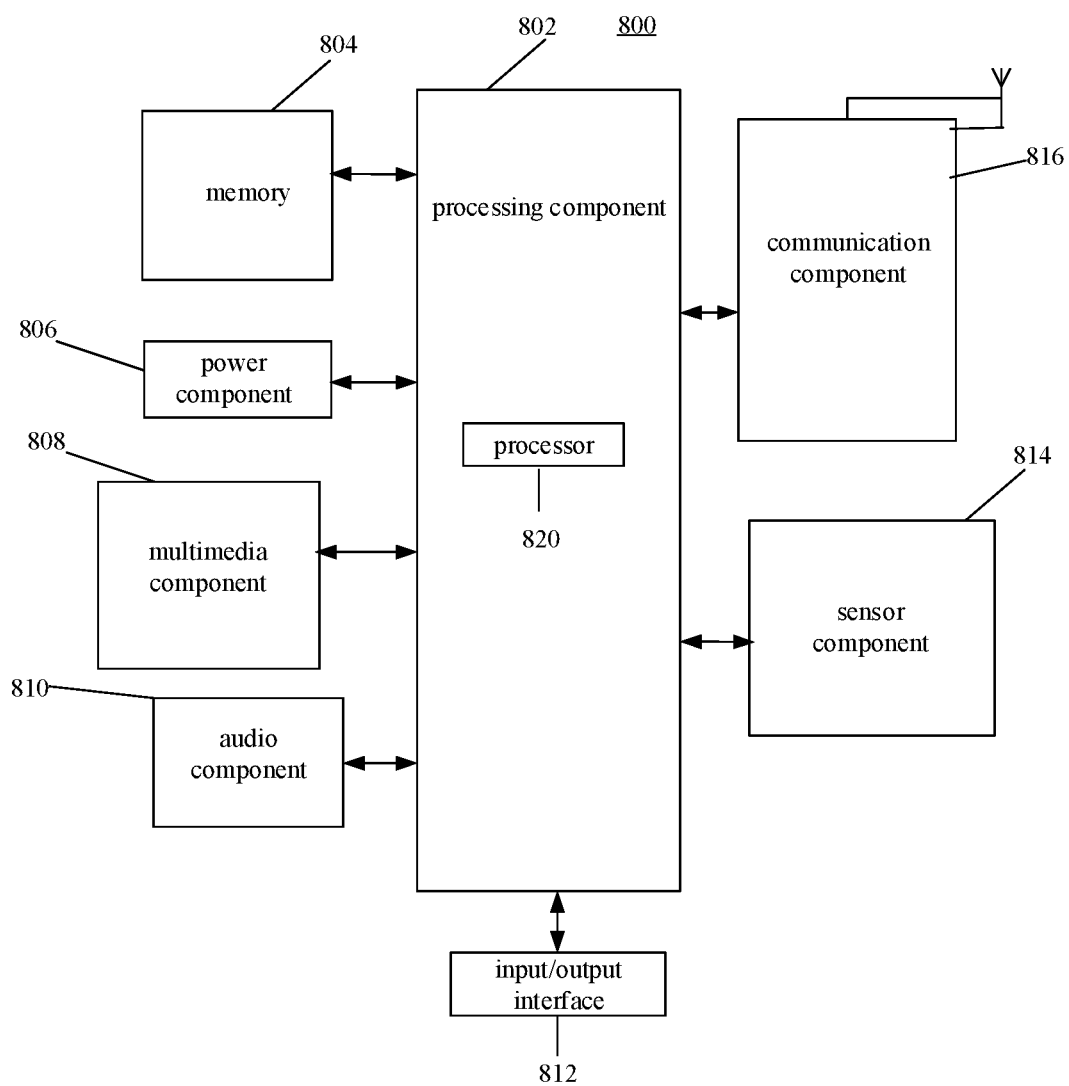
FIG. 9 is a block diagram illustrating a resource processing apparatus for a mobile terminal according to some embodiments of the disclosure.

FIG. 9 is a block diagram illustrating a resource processing apparatus 800 for a mobile terminal according to some embodiments of the disclosure. For example, the resource processing apparatus 800 may be a mobile phone, a computer, a digital broadcast terminal, a messaging device, a gaming console, a tablet device, a medical device, an exercise device, a personal digital assistant, and the like.

Referring to FIG. 9, the resource processing apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 generally is configured to control the overall operation of the resource processing apparatus 800, such as operations associated with display, telephone call, data communication, camera operation and recording operation. The processing component 802 may include one or more processors 820 to execute instructions to complete all or part of the operations of the method described above. In addition, the processing component 802 may include one or more modules to facilitate the interaction between the processing component 802 and other components. For example, the processing component 802 may include a multimedia module to facilitate the interaction between the multimedia component 808 and the processing component 802.

The memory 804 is configured to store various types of data to support operations at the resource processing apparatus 800. Examples of the data include instructions of any application program or method operated on the resource processing apparatus 800, contact data, phonebook data, messages, pictures, videos, etc. The memory 804 may be implemented by any type of volatile or non-volatile memory devices or combinations thereof, such as an Electrically Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic disk or a compact disk.

The power component 806 is configured to provide power to various components of the resource processing apparatus 800. The power component 806 may include a power management system, one or more power sources, and any other components associated with the generation, management, and distribution of power for the resource processing apparatus 800.

The multimedia component 808 may include a screen for providing an output interface between the resource processing apparatus 800 and a user. In some embodiments, the screen may include a Liquid Crystal Display (LCD) and a Touch Panel (TP). In some embodiments, organic light-emitting diode (OLED) or other types of displays can be employed. If it includes the TP, the screen may be implemented as a touch screen to receive an input signal from a user. The TP includes one or more touch sensors to sense touch, swipe, and gestures on the TP. The touch sensor may not only sense a boundary of a touch or swipe action, but also detect duration and pressure related to the touch or swipe operation. In some embodiments, the multimedia component 808 includes a front camera and/or a rear camera. The front camera and/or the rear camera may receive external multimedia data when the resource processing apparatus 800 is in an operation mode, such as a photographing mode or a video mode. Each front camera and each rear camera may be fixed optical lens systems or may have focal lengths and optical zoom capabilities.

The audio component 810 is configured to output and/or input audio signals. For example, the audio component 810 includes a Microphone (MIC) configured to receive external audio signals when the resource processing apparatus 800 is in an operation mode, such as a call mode, a recording mode and a voice recognition mode. The received audio signals may be further stored in the memory 804 or sent via the communication component 816. In some embodiments, the audio component 810 may further include a speaker configured to output audio signals.

The I/O interface 812 provides an interface between the processing component 802 and peripheral interface modules, such as a keyboard, a click wheel, or buttons. These buttons may include, but not limited to: a home button, a volume button, a start button, and a lock button.

The sensor component 814 includes one or more sensors configured to provide various aspects of state evaluation for the resource processing apparatus 800. For example, the sensor component 814 may detect an on/off status of the resource processing apparatus 800, and relative positioning of the components. For example, the component is the display and the keypad of the resource processing apparatus 800. The sensor component 814 may also detect a change in position of the resource processing apparatus 800 or a component of the resource processing apparatus 800, a presence or absence of user contact with the resource processing apparatus 800, an orientation or an acceleration/deceleration of the resource processing apparatus 800, and a change in temperature of the resource processing apparatus 800. The sensor component 814 may include a proximity sensor configured to detect the existence of nearby objects under the situation of no physical contact. The sensor component 814 may also include an optical sensor, such as a CMOS or CCD image sensor, for use in imaging application. In some embodiments, the sensor component 814 may further include an accelerometer sensor, a gyroscope sensor, a magnetic sensor, a pressure sensor, or a temperature sensor.

The communication component 816 is configured to facilitate communication, wired or wireless, between the resource processing apparatus 800 and other devices. The resource processing apparatus 800 may access a wireless network based on a communication standard, such as Wi-Fi, 2G, 3G, 4G, 5G or a combination thereof. In some embodiments, the communication component 816 may receive broadcast signals or broadcast related information from an external broadcast management system via a broadcast channel. In some embodiments, the communication component 816 may further include a Near Field Communication (NFC) module to facilitate short-range communications. For example, the NFC module can be implemented based on the Radio Frequency Identification (RFID) technology, the Infrared Data Association (IrDA) technology, the Ultra-Wideband (UWB) technology, the Bluetooth (BT) technology, and other technologies.

In some embodiments, the resource processing apparatus 800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic elements for executing the method described above.

In some embodiments, the disclosure further provides a non-transitory computer-readable storage medium including instructions, such as the memory 804 including instructions, which may be executed by the processor 820 of the resource processing apparatus 800 to complete the above method. For example, the non-transitory computer-readable storage medium may be an ROM, a CD-ROM, a magnetic tape, a floppy disk, an optical data storage device, and the like.

The embodiments of the disclosure further provide a computer storage medium which stores computer-executable instructions. The computer-executable instructions can implement the method provided by any embodiment of the disclosure after being executed by the processor.

Figure 10:
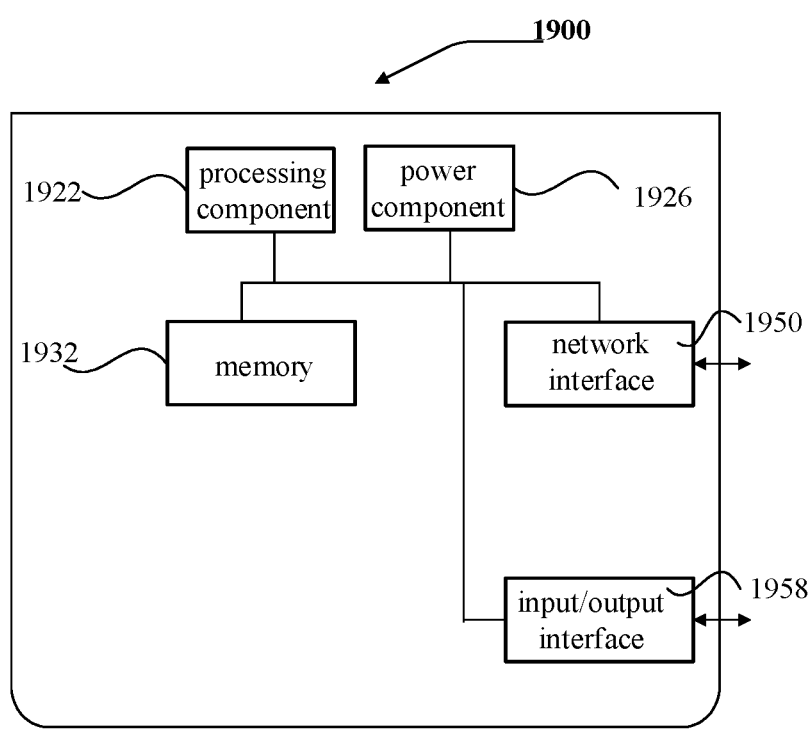
FIG. 10 is a block diagram illustrating a resource processing apparatus for a mobile terminal according to some embodiments of the disclosure.

FIG. 10 is a block diagram illustrating a resource processing apparatus 1900 for a mobile terminal according to some embodiments of the disclosure. For example, the resource processing apparatus 1900 can be provided as a server. Referring to FIG. 10, the resource processing apparatus 1900 includes a processing component 1922 further including one or more processors, and memory resources represented by a memory 1932 for storing instructions executable by the processing component 1922, such as application programs. The application programs stored in the memory 1932 may include one or more modules each of which corresponds to a set of instructions. Furthermore, the processing component 1922 is configured to execute the instructions to execute the above method.

The resource processing apparatus 1900 may also include a power component 1926 configured to execute power management of the resource processing apparatus 1900, a wired or wireless network interface 1950 configured to connect the resource processing apparatus 1900 to the network, and an input/output (I/O) interface 1958. The resource processing apparatus 1900 may operate an operating system stored in the memory 1932, such as Windows Server™, Mac OS X™, Unix™, Linux™, FreeBSD™, or the like.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A resource processing method for a mobile terminal, comprising:
    determining a current application scenario and usage data of the mobile terminal;
    inputting the usage data into a machine learning algorithm model corresponding to the current application scenario to obtain predicted recommendation parameters; and
    configuring resources of the mobile terminal based on the recommendation parameters,
    wherein the usage data comprise feature data when an application program of the mobile terminal runs under the current application scenario,
    wherein the feature data indicate running features of the mobile terminal under the current application scenario, and the running features comprise at least one of:
    a screen resolution of the mobile terminal, or memory usage,
    wherein
       said determining the current application scenario and the usage data of the mobile terminal comprises:
          determining a current application scenario and usage data of an application running in an inner core of the mobile terminal;
       said configuring the resources of the mobile terminal based on the recommendation parameters comprises:
          configuring resources of the inner core based on the recommendation parameters;
       the method further comprises: packaging the recommendation parameters into a configuration portion; and
       said configuring the resources of the inner core based on the recommendation parameters comprises:
          calling the configuration portion to configure the inner core based on the recommendation parameters in the configuration portion.

2. The resource processing method according to claim 1, wherein prior to the inputting the usage data into the machine learning algorithm model corresponding to the current application scenario, the resource processing method further comprises:
    reporting samples of the usage data acquired under different scenarios to a cloud server;
    receiving model information of the machine learning algorithm model, the model information being obtained by the cloud server by training samples; and
    constructing the machine learning algorithm model in the mobile terminal based on the model information.

3. The resource processing method according to claim 2, wherein the reporting the samples of the usage data acquired under different scenarios to the cloud server comprises:
    obtaining a sample of the usage data acquired under a target scenario, wherein the sample of the usage data comprises: usage data of system resources, usage data of device resources, configuration parameters of the system resources, and configuration parameters of the device resources, wherein the system resources are configured to schedule the device resources; and
    reporting the sample of the usage data to the cloud server.

4. The resource processing method according to claim 1, further comprising:
    sending scenario information of the current application scenario to a cloud server; and
    receiving a first control instruction sent based on the scenario information by the cloud server, wherein the first control instruction carries indication information of the machine learning algorithm model determined according to the scenario information; wherein
    inputting the usage data into the machine learning algorithm model corresponding to the current application scenario to obtain the predicted recommendation parameters, comprises:
       inputting the usage data into the machine learning algorithm model selected through the first control instruction from a plurality of alternative models to obtain the predicted recommendation parameters.

5. The resource processing method according to claim 1, further comprising:
    receiving a second control instruction from a cloud server, wherein the second control instruction carries at least one piece of following information: type indication information controlling the mobile terminal to acquire the usage data, and indication information controlling the mobile terminal to report or stop reporting the usage data to the cloud server; and
    based on the second control instruction, reporting or stopping reporting the usage data to the cloud server based on the second control instruction.

6. A resource processing apparatus for a mobile terminal, comprising:
    a processor; and
    memory coupled with the processor and configured to store instructions executable by the processor,
    wherein the processor is configured to:
    determine a current application scenario and usage data of the mobile terminal;
    input the usage data into a machine learning algorithm model corresponding to the current application scenario to obtain predicted recommendation parameters; and
    configure resources of the mobile terminal based on the recommendation parameters,
    wherein the usage data comprise feature data when an application program of the mobile terminal runs under the current application scenario,
    wherein the feature data indicate running features of the mobile terminal under the current application scenario, and the running features comprise at least one of:
    a screen resolution of the mobile terminal, or memory usage,
    wherein the processor is further configured to:
       determine a current application scenario and usage data of an application running in an inner core of the mobile terminal;
       configure resources of the inner core based on the recommendation parameters;
       package the recommendation parameters into a configuration portion; and
       call the configuration portion to configure the inner core based on the recommendation parameters in the configuration portion.

7. The resource processing apparatus according to claim 6, wherein the processor is further configured to:
    report samples of the usage data acquired under different scenarios to a cloud server;
    receive model information of the machine learning algorithm model obtained by the cloud server by training the samples; and construct the machine learning algorithm model in the mobile terminal based on the model information.

8. The resource processing apparatus according to claim 7, wherein the processor is further configured to obtain a sample of the usage data acquired under a target scenario, the sample of the usage data comprises: usage data of system resources, usage data of device resources, configuration parameters of the system resources, and configuration parameters of the device resources, and the system resources are configured to schedule the device resources; and report the sample of the usage data to the cloud server.

9. The resource processing apparatus according to claim 6, wherein the processor is further configured to:
send scenario information of the current application scenario to a cloud server;
receive a first control instruction sent based on the scenario information by the cloud server, wherein the first control instruction carries indication information of the machine learning algorithm model determined according to the scenario information; and
input the usage data into the machine learning algorithm model selected through the first control instruction from a plurality of alternative models to obtain the predicted recommendation parameters.

10. The resource processing apparatus according to claim 6, wherein the processor is further configured to:
receive a second control instruction from a cloud server, wherein the second control instruction carries at least one piece of following information: type indication information controlling the mobile terminal to acquire the usage data, and indication information controlling the mobile terminal to report or stop reporting the usage data to the cloud server; and
report or stop reporting the usage data to the cloud server based on the second control instruction.

11. A non-transitory computer-readable storage medium, having stored computer-executable instructions that, when executed by a processor, implement a method including operations of:
determining a current application scenario and usage data of the mobile terminal;
inputting the usage data into a machine learning algorithm model corresponding to the current application scenario to obtain predicted recommendation parameters; and
configuring resources of the mobile terminal based on the recommendation parameters,
wherein the usage data comprise feature data when an application program of the mobile terminal runs under the current application scenario,
wherein the feature data indicate running features of the mobile terminal under the current application scenario, and the running features comprise at least one of:
memory usage,
wherein
said determining the current application scenario and the usage data of the mobile terminal comprises:
determining a current application scenario and usage data of an application running in an inner core of the mobile terminal;
said configuring the resources of the mobile terminal based on the recommendation parameters comprises:
configuring resources of the inner core based on the recommendation parameters;
the method further comprises: packaging the recommendation parameters into a configuration portion; and
said configuring the resources of the inner core based on the recommendation parameters comprises:
calling the configuration portion to configure the inner core based on the recommendation parameters in the configuration portion.

12. The non-transitory computer-readable storage medium according to claim 11, wherein prior to the inputting the usage data into the machine learning algorithm model corresponding to the current application scenario, the method further comprises:
reporting samples of the usage data acquired under different scenarios to a cloud server;
receiving model information of the machine learning algorithm model, the model information being obtained by the cloud server by training samples; and
constructing the machine learning algorithm model in the mobile terminal based on the model information;
wherein the reporting the samples of the usage data acquired under different scenarios to the cloud server comprises:
obtaining a sample of the usage data acquired under a target scenario, wherein the sample of the usage data comprises: usage data of system resources, usage data of device resources, configuration parameters of the system resources, and configuration parameters of the device resources, wherein the system resources are configured to schedule the device resources; and
reporting the sample of the usage data to the cloud server.

13. The non-transitory computer-readable storage medium according to claim 11, wherein the method further comprises:
sending scenario information of the current application scenario to a cloud server; and
receiving a first control instruction sent based on the scenario information by the cloud server, wherein the first control instruction carries indication information of the machine learning algorithm model determined according to the scenario information; wherein
inputting the usage data into the machine learning algorithm model corresponding to the current application scenario to obtain the predicted recommendation parameters comprises:
inputting the usage data into the machine learning algorithm model selected through the first control instruction from a plurality of alternative models to obtain the predicted recommendation parameters.

14. The non-transitory computer-readable storage medium according to claim 11, wherein the method further comprises:
receiving a second control instruction from a cloud server, wherein the second control instruction carries at least one piece of following information: type indication information controlling the mobile terminal to acquire the usage data, and indication information controlling the mobile terminal to report or stop reporting the usage data to the cloud server; and
based on the second control instruction, reporting or stopping reporting the usage data to the cloud server based on the second control instruction.

15. A mobile terminal implementing the method of claim 1, comprising a display screen, wherein:
the recommendation parameters are obtained based on the current application scenario and the usage data of the mobile terminal, the application scenario and the usage data both truly reflect resource configuration requirements of a user; and the mobile terminal is configured to:

obtain predicted recommendation parameters meeting individualized user requirements by inputting the usage data into the machine learning algorithm model corresponding to the current application scenario; and configure the resources of the mobile terminal based on the recommendation parameters, to thereby realize individualization of resource configuration in the mobile terminal, improve individualized experience of the user and the resource utilization, avoid problems caused by configuration using empirical parameters including a slow system response due to memory allocation in the current application scenario being insufficient, and reduce resource waste caused by over-allocation of memory;

wherein the usage data include feature data when an application program of the mobile terminal runs under the current application scenario; the feature data indicate running features of the mobile terminal under the current application scenario; and the running features include at least one of: a screen resolution of the screen of the mobile terminal, a frequency of instruction execution, a networking state, memory usage, and power consumption; and wherein:

the current application scenario is the user listening to music with the display screen of the mobile terminal being off or the user playing a video game;

the usage data include time of the display screen of the mobile terminal being off, or the time of the video game being shown on the display screen;

the machine learning algorithm comprises at least one of a Factorization Machine (FM) model, a Deep Neural Networks (DNN) model, and a Deep Factorization Machine (DeepFM) model;

the recommendation parameters include allocation parameters of hardware resources or software resources; the hardware resources including at least one of input/output interface resources and memory resources, the software resources including at least one resources for scheduling management programs, and frequency resources for executing program instructions; and the mobile terminal is configured to allocate resources to a system program or application program running in the mobile terminal for the current application scenarios based on the recommendation parameters.

* * * * *